United States Patent [19]

Capp et al.

[11] Patent Number: 4,894,193
[45] Date of Patent: Jan. 16, 1990

[54] METHOD OF FORMING A HIGH-TEMPERATURE-FLUID SENSOR

[75] Inventors: F. William Capp, Winston-Salem; Don J. Gerhardt, Clemmons; Randal A. Little, Mocksville, all of N.C.

[73] Assignee: Ingersoll-Rand Company, Woodcliff Lake, N.J.

[21] Appl. No.: 249,023

[22] Filed: Sep. 26, 1988

[51] Int. Cl.$^4$ ............................................. B29C 45/14
[52] U.S. Cl. ................................ 264/104; 73/61 LM; 122/504.1; 264/254; 264/274
[58] Field of Search ............ 264/254, 261, 277, 271.1, 264/275, 279, 104, 105, 204, 274; 122/504.1; 73/61 LM, 204.23; 337/413, 416; 374/140; 164/108, 111, 112

[56] References Cited

U.S. PATENT DOCUMENTS

| | | | |
|---|---|---|---|
| 4,398,785 | 8/1983 | Hedrick | 264/274 |
| 4,483,811 | 11/1984 | Hirata | 264/272.13 |
| 4,632,798 | 12/1986 | Eickman et al. | 264/331.12 |
| 4,728,698 | 3/1988 | Isayev et al. | 264/331.12 |

FOREIGN PATENT DOCUMENTS 2032690  5/1980  United Kingdom ........... 264/272.11

Primary Examiner—James Lowe
Attorney, Agent, or Firm—B. J. Murphy; D. W. Tibbott; J. R. Bell

[57] ABSTRACT

The sensor is formed with a polymer body which confines electrical conductors, with the conductors projecting from opposite ends of the body. The conductors' projections at one end define terminal blades, and at the opposite end are shrouded with, and electrically connected by, fusible material that is molded in place. An electrically inert buffer, formed of the same body polymer, is introduced between the conductors at the opposite end, and the fusible material is deposited about the ends and buffer as a cylindrical shell. A V-shaped notch is formed in the buffer for lockingly-engaging the shell. The body has wrenching flats formed thereabout and tapered pipe threads formed thereon to allow its installation in the wall of a pressure vessel, pipe, or housing, with the fusible-material end exposed therewithin.

14 Claims, 1 Drawing Sheet

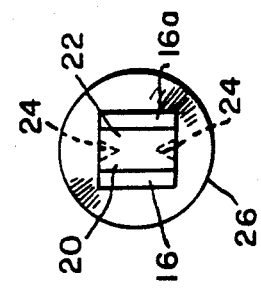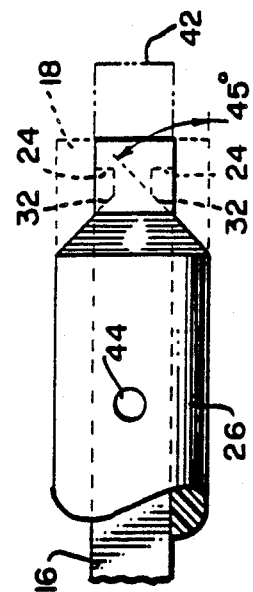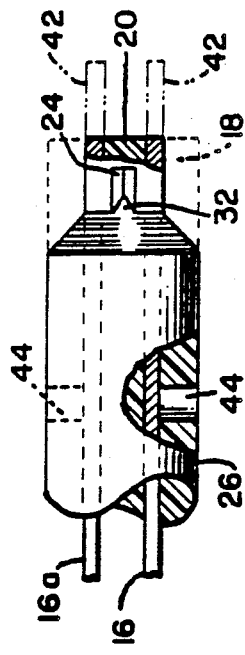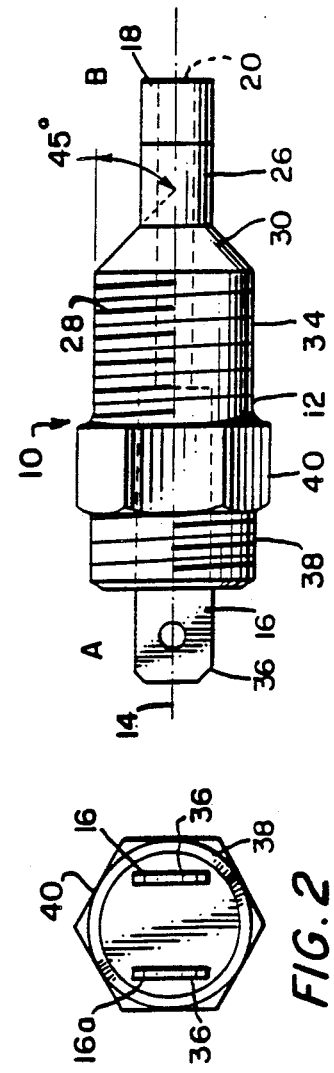

METHOD OF FORMING A HIGH-TEMPERATURE-FLUID SENSOR

This invention pertains to methods of forming high-temperature (or fire) sensing devices for use in environments in which there obtain fluids susceptible of excessively high temperatures, such as a vessel or pipe that is pressurized with air, gas or a liquid, and in particular to a method of forming a high-temperature-fluid sensor having a fusible detector.

High-temperature-fluid sensors are currently available for use in the aforesaid environments, that include high pressure applications, which use a mechanical switch activated by heat. Such sensors are generally inadequate for the following reasons:

1. High cost
2. Low reliability
3. High response time

There are known high-temperature-fluid sensing devices, and methods of forming them, that have fusible links, and these are generally superior to the heat-activated-switch types for being less costly, more reliable, and for exhibiting a quick response. Exemplary thereof are U.S. Pat. Nos. 254,887, issued on 14 Mar., 1882, to R. Schwartzkopff, for "Safety Apparatus for Steam Boilers", and 3,387,593, issued to R. H. Gingras, for "Safety Device for Fired Pressure Vessels", on 11 June, 1968.

It is an object of this invention, then, to set forth a novel method of forming a high-temperature-fluid sensor, with a fusible detector, having a number of innovative forming steps unknown in the prior art.

Particularly is it an object of this invention to disclose a method of forming a high-temperature-fluid sensor, with a fusible detector, comprising the steps of providing a pair of elongate, electrical conductors; providing a mold; holding the conductors in a spaced-apart and substantially parallel, juxtaposed disposition in said mold; introducing polymer into the mold and forming a polymer body (a) about intermediate portions of said conductors, and (b) between said portions of said conductors; wherein said introducing step comprises introducing polymer between juxtaposed, terminal ends of said conductors, at one, common end thereof and forming thereat an electrically inert buffer; depositing fusible material about said terminal ends of said conductors and said buffer; and forming said buffer with a surface discontinuity for lockingly engaging said fusible material therewith, prior to performing the fusible material depositing step.

Further objects of this invention, as well as the novel steps thereof, will become more apparent by reference to the following description taken in conjunction with the accompanying figures, in which:

FIG. 1 is a side view of an embodiment of a sensor, formed according to the novel method;

FIG. 2 is an end view of the FIG. 1 embodiment taken from the left-hand side of FIG. 1;

FIG. 3 is an end view thereof taken from the right-hand side of FIG. 1;

FIG. 4 is an enlarged side view of just the stub portion of the body with the fusible material shown only phantom;

FIG. 5 is an end view of the stub portion taken from the right-hand side of FIG. 4; and FIG. 6 is a view like that of FIG. 4, the same, however, being a plan or top view.

According to the invention, a high-temperature-fluid sensor with a fusible detector 10 is formed with an injection-molded body 12, of polymer material, having a longitudinal axis 14. A pair of electrical conductors 16 and 16a are held in a mold, in spaced-apart, and substantially parallel, juxtaposed disposition. The polymer material, then, is introduced into the mold to form the body 12 about intermediate portions of the conductors, and between said portions, in order that portions of the conductors 16 and 16a will project from opposite axial ends "A" and "B" of the body 12. As explained in the ensuing text, fusible material 18 is deposited on and engaged with (to electrically bridge between) the projecting portions of conductors 16 and 16a at end "B". But no fusible material 18 is deposited between those projecting portions of conductors 16 and 16a at end "B". Rather, a buffer 20 of polymer material is caused to insinuate itself therebetween during the injection-molding of the body 12.

The space or void 22 obtaining between the projecting portions of the electrical conductors 16 and 16a, at the axial end "B" must be filled with an insulating material. If the void 22 remains open, or is filled with fusible material 18, an electrical conducting path will remain even if the fusible material 18 is fused to a molten state. A wicking action of the molten, fusible material would tend to keep the fusible material between the projecting portions of conductors 16 and 16a. It is a teaching of this invention to fill the void 22 with the polymer buffer 20, as aforesaid, during the injection molding of the body 12. The buffer 20 also reduces the mass of the fusible material 18, which improves the response time of the sensor 10 during activation at high temperatures.

The buffer 20 is formed with a mechanical retainer feature, in the form of a V-notch 24, that mechanically locks the fusible sensing material 18 on the small-diameter, stub portion 26 of the sensor 10. The V-notch 24 is superior to a round, square or rectangular notch because it provides for better plastic flow during the injection process, provides a more durable insert on the molding tool, provides better filling of the cavity during the application of the fusible material and places the fusible material 18 closer to the peripheral surface where the reaction time to a high temperature will be quicker.

As noted, the body 12 has a small-diameter, stub portion 26; it also has a larger-diameter, shank portion 28, and a transformation portion 30 which, during the molding of the body 12, is formed of tapered configuration. The tapered configuration of portion 30 defines an angled ramp that allows the molten fusible material 18 to flow away from the electrical conductors' projecting portions when the sensor 10 is operated in an inverted position. The ramp angle is optimum between thirty and sixty degrees, and the ramp angle is shown as having been formed at forty-five degrees in FIG. 1.

In the fabrication of the sensor 10, the stub portion 26 having projecting portions of conductors 16 and 16a, and the buffer 20, is inserted down into a hot mold that will apply the fusible material 18. The molten, fusible material 18 fills the V-notch 24 during this molding process. The notch 24 is formed with an angled ramp 32 at one end to allow any trapped gases to escape during this molding process. The notch ramp angle, too, is optimum between thirty and sixty degrees. The angle of ramp 32 is shown as having been formed at forty-five degrees, in FIG. 4, and the ramp 32 terminates at an end, and onto the outer surface, of the stub portion 26.

The body 12 is formed in a mold, as aforesaid, which forms taper pipe threads 34 thereabout. Threads 34 are used to install the sensor through the wall of a pressure vessel or pipe, and are formed on the shank portion 28 during the body-molding step. Electrical connections are made to the blade type electrical terminals 36, of course, in the use of the detector 10.

In the body molding, another threaded portion 38 is formed adjacent to the blade type terminals 36; the same is used to attach accessories such as a wiring harness shield connector or a name plate.

The body 12 is formed of an injected molded polymer material as earlier noted. It supports the electrical conductors 16 and 16a, provides proper spacing thereof at the fusible end "B", provides for proper spacing of the terminals at the connector end "A", provides sealing in a pressure vessel with the integral threads 34, and is formed with a hex head 40, by means of a body mold so configured, for insertion and removal and has the threaded extended head 38 for connecting accessories such as shield adapters or name plates. The polymer of the body 12 is a non-conducting electrical material with a dielectric strength of 400 volts/mil or better per ASTM D-149 so that the conductors 16 and 16a do not have to be insulated or isolated from the body. The sensor 10 may be used in a pressurized or non pressurized environment.

Specifically, the body is molded (in an exemplary embodiment) of polyetherimide resin, with from ten to forty percent of glass reinforcement dispersed therein. Alternatively, polyphenylene sulfide or a liquid crystal polymer may be used; any of these polymers provides good sealing characteristics so that the use of external sealants for the threads is not required in many applications. The glass reinforcement provides high strength at elevated temperatures.

The fusible material 18 is molded onto the detector in the form of a cylindrical shell. This contour has several redeeming features.

a. It has a high surface-to-volume ratio which promotes good heat transfer and rapid response time when melting.

b. It has a good aerodynamic shape for low drag. The air or gas velocities thereat could exceed 350 mph. The cylindrical shape reduces aerodynamic erosion.

c. The external contour is symmetrical so its performance does not depend on its orientation.

d. Fusible material is easy to apply and mold in a cylindrical contour.

The electrical conductors 16 and 16a must be precisely located during the injection molding of the body 12. It is difficult to hold the conductors at the tip end "B" and be able to inject plastic therebetween all the way to the end, and to form the buffer 20. Therefore, the conductors 16 and 16a are extended (approx. 0.125") to allow tools to hold the conductors in precise alignment during the injection molding. The 0.125" tips of the conductors are cut off, then, prior to application of the fusible material 18. These extensions 42 are shown in phantom in FIGS. 4 and 6.

It is desirable to have the diameter of the stub portion 26 as small as possible to reduce costs and to minimize the aerodynamic influence on the air or fluid flowing across the sensor 10. The clearance between the conductors 16 and 16a and the wall of the stub portion 26 has to be controlled. There is a natural tendency for the injected plastic to push the conductors 16 and 16a out close to the wall of the body mold (not shown). Accordingly, the invention teaches the use of pins in the tooling to control the outward movement of the conductors 16 and 16a during the injection process. Pin holes 44 shown formed in sides of the stub portion 26, are formed by the tooling pins which intrude into like, pin-accomodating holes provided in the body mold.

While we have described our invention in connection with a specific practice thereof it is to be clearly understood that this is done only by way of example, and not as a limitation to the scope of our invention as set forth in the objects thereof and in the appended claims.

We claim:

1. A method of forming an high-temperature-fluid sensor with a fusible detector, comprising the steps of:
   providing a pair of elongate, electrical conductors;
   providing a mold;
   holding the conductors in a spaced-apart and substantially parallel, juxaposed disposition in said mold;
   introducing polymer into the mold and forming a polymer body (a) about intermediate portions of said conductors, and (b) between said portions of said conductors; wherein
   said introducing step comprises introducing polymer between juxtaposed, terminal ends of said conductors, at one, common end thereof and forming thereat an electrically inert buffer between said ends;
   depositing electrically conductive fusible material on and about said terminal ends of said conductors, and about said buffer to electrically bridge between said terminal ends; and
   forming said buffer with a surface discontinuity for lockingly engaging said fusible material therewith, prior to performing the fusible material depositing step.

2. A method of forming a sensor, according to claim 1, wherein:
   said discontinuity-forming step comprises forming a recess in said buffer.

3. A method of forming a sensor, according to claim 2, wherein said recess-forming step comprises:
   forming said recess as a V-shaped notch.

4. A method of forming a sensor, according to claim 1, wherein:
   said body-forming step comprises forming said body with an intermediate shank portion, and a transformation portion, wherein said transformation portion (a) is between, and contiguous with, said shank portion and said buffer, and (b) has a sloped surface.

5. A method of forming a sensor, according to claim 4, wherein said body-forming step further comprises:
   forming said transformation portion with a conical surface.

6. A method of forming a sensor, according to claim 4, wherein said discontinuity-forming step comprises:
   forming a V-shaped notch, in said buffer, which has a ramp rising therefrom and terminating at a junction of said buffer and said transformation portion.

7. A method of forming a sensor, according to claim 4, wherein said body-forming step further comprises:
   forming said shank portion with a pipe thread thereon.

8. A method of forming a sensor, according to claim 7, wherein said body-forming step further comprises:
   forming an end of said body, which end is opposite from said buffer, with a threaded surface.

9. A method of forming a sensor, according to claim 8, wherein said body-forming step further comprises:

forming a portion of said body, which is intermediate said shank portion and said opposite end, with wrenching flats thereon.

10. A method of forming a sensor, according to claim 1, wherein said polymer-introducing step further comprises:

introducing a polymer which has a high-strength reinforcement therein.

11. A method of forming a sensor, according to claim 10, wherein said polymer-introducing step comprises:

introducing a polymer which has a glass reinforcement dispersed therein.

12. A method of forming a sensor, according to claim 1, wherein said polymer-introducing step further comprises:

introducing a polymer selected from the group consisting of polyphenylene sulfide, liquid crystal polymer, and polyetherimide resin.

13. A method of forming a sensor, according to claim 1, wherein said fusible material depositing step comprises:

providing molten fusible material; and
inserting said terminal ends of said conductors and said buffer into said molten fusible material to accrete fusible material on said ends and buffer.

14. A method of forming a sensor, according to claim 1, wherein said fusible material depositing step comprises:

forming said fusible material, about said terminal ends and said buffer, as a cylindrical shell.

* * * * *